United States Patent [19]

Danziger

[11] Patent Number: 5,426,449
[45] Date of Patent: Jun. 20, 1995

[54] PYRAMID SHAPED ERGONOMIC KEYBOARD

[76] Inventor: Paul Danziger, 11807 Bunker Hill Cir., Houston, Tex. 77024

[21] Appl. No.: 49,547

[22] Filed: Apr. 20, 1993

[51] Int. Cl.$^6$ .............................................. G09G 3/02
[52] U.S. Cl. .................... 345/168; 345/156; 400/489
[58] Field of Search ............ 400/472, 488, 489, 490, 400/703, 715; 340/706, 709, 711, 710; 341/20, 21, 22; 248/118; D14/100, 106, 114, 115; 364/709, 705; 345/168, 172, 156

[56] References Cited

U.S. PATENT DOCUMENTS

| | | | |
|---|---|---|---|
| 360,529 | 5/1887 | Jurey | 248/118 |
| 725,855 | 4/1903 | Loyd | 341/22 |
| 3,945,482 | 3/1976 | Einbinder | 400/489 |
| 4,041,295 | 8/1977 | Ido | 341/22 |
| 4,739,128 | 4/1988 | Grisham | 200/6 A |
| 5,067,834 | 11/1991 | Szmanda | 400/489 |
| 5,119,078 | 6/1992 | Grant | 340/706 |
| 5,122,786 | 6/1992 | Rader | 340/706 |
| 5,137,384 | 8/1992 | Spencer | 400/489 |
| 5,160,919 | 11/1992 | Mohler | 340/711 |
| 5,161,760 | 11/1992 | Terbrack | 340/711 |

FOREIGN PATENT DOCUMENTS 2244546 12/1991 United Kingdom .

OTHER PUBLICATIONS

Popular Science, Sep. 1990, Product Announcement p. 10.

Primary Examiner—Alvin E. Oberley
Assistant Examiner—Aaron Banerjee

[57] ABSTRACT

A pyramid shaped ergonomic keyboard comprised of three sets of keys or three keypads. A front keypad faces the operator and contains number keys, specialty keys, function keys and a trackball/mouse. The left and right keypad are at approximately a 45° angle positioned in a tripod fashion substantially meeting at a vertex and substantially forming a pyramid with the front keypad. The left keypad and right keypad each contain the key in standard QWERTY layout (albeit split and positioned at a 45° angle). The front, left and right keypads may be mounted or attached to a support frame. The keypads are adjustable in a horizontal and vertical manner relative to each other allowing individual adjustment of each keypad for the convenience of the operator. Protruding from the frame between the front keypad and the left keypad and the front keypad and the right keypad are handrests to support the hands when typing. The handrests may be adjusted in a horizontal and vertical manner to provide greater support and comfort for the operator while typing. Both hands are in a natural and relaxed position, substantially facing together with wrists straight and the thumbs up. The handrests further facilitate maintaining the wrists in a substantially neutral or relaxed arc. The resulting natural and relaxed hand and wrist positions reduce the likelihood of repetitive stress injuries such as carpal tunnel syndrome, flexor tendinitis, extensor tendinitis, and DeQuervain's Disease.

4 Claims, 7 Drawing Sheets

PYRAMID SHAPED ERGONOMIC KEYBOARD

FIELD OF THE INVENTION

The present invention relates generally to keyboards, and more particularly to ergonomically designed keyboards for use with computers, electronic typewriters and other electronic data input devices.

BACKGROUND OF THE INVENTION

The present invention relates to keyboards for computers, electronic typewriters, data entry units, and other similar apparatus. In particular this invention provides a unique keyboard comprised of three angled sets of keys which are ergonomically positioned to form a pyramid-shaped keyboard. The present invention allows an improved and more natural hand, arm and position when typing, and thereby reduces repetitive stress injuries (RSI) such as carpal tunnel syndrome (CTS), flexor tendinitis, extensor tendinitis, and De-Quervain's disease.

Frequent use of a conventional horizontal keyboard results in injuries due to the unnatural angle the hands are required to assume to operate the keyboard when typing. An operator of a conventional keyboard must rotate his arms so as to dispose his hands are in a palms-down position, by pronation, and align his fingers with the rows of keys by twisting each hand outward at the wrist, by ulnar deviation. Conventional horizontal keyboards result in the operator's arm and hand muscles operating outside their natural and ideal range, and thus functioning poorly and increasing risks of injury. Tendons and nerves are adversely affected, and over time this abuse can lead to repetitive stress injuries. For example, an operator of a conventional horizontal keyboard often types with bent wrists, resulting in irritation and bunching of the sheaths surrounding the tendons. This bunching affects the sensitive median nerve in the carpal tunnel, and may lead to carpal tunnel syndrome (CTS). Symptoms of CTS are "shooting" pains from the wrists to the forearms, palms or fingers. In extreme cases, CTS and other RSI are permanently debilitating. In a significant number of cases, repetitive stress injuries force keyboard operators or other workers which frequently use a keyboard to an alternative type of employment that does not require use of a keyboard.

Computer keyboard injuries annually afflict about 185,000 office and factory workers and cost companies about $20 million. Presently, annual worker's compensation payments for these injuries is approximately $1.1 billion. The competitive advantages of data processing indicate that computer use, and therefore the number, frequency and cost of repetitive stress injuries due to conventional keyboards, is certain to increase. Over the last decade the number of employees using conventional computer keyboards in the United States has increased from approximately 5 million to 50 million. In total, there are presently about 120 million keyboard operators in the United States. To reduce the occurrence of CTS and other repetitive stress injuries, a keyboard should alleviate the underlying causes of repetitive stress injuries. Such an improved keyboard, which is realized in the present invention, must relieve muscle and tendon strain, lessen or reduce wrist deviation, reduce or eliminate forearm pronation, reduce the distance fingers must travel and lessen the force necessary to the keys. Dr. David Thompson, a professor emeritus at Stanford University has found that muscles worked less with a keyboard on a 30 degree tilt and significantly less with a 60 degree tilt. Dr. Thompson stated that it took about 40 percent more muscle effort to type on a flat linear keyboard than on a keyboard with a 60 degree tilt. Additionally, muscles worked less with straight wrists than when the wrists are bent. Dr. Thompson explained that the harder muscles work the more likely they are to become overworked and this increases the possibility the user will become fatigued, as well as the likelihood that repetitive stress injuries may occur.

There is evidence that a keyboard user faces a higher risk of CTS when performing repetitive actions in a cold environment. H. C. Chiang, S. S. Chen, H. S. Yu and Y. C. Ko in The Occurrence of Carpal Tunnel Syndrome in Frozen Food Factory Employee, Kao-Hsiung I Hsueh Ko Hsueh Tsa Chih 6(2):73–80 (Feb. 1990) found that employees who exposed to a cold environment while performing repetitive actions were more likely to have suffer from CTS than those who had no exposure to cold while performing repetitive actions, based upon CTS finds of 40.54% and 37.19%, respectively, for the individuals studied.

It is known that the body's muscles function better and are less prone to injury in a relatively warm environment. However, the temperature in the typical office environment is kept relatively cold, in order to promote mental alertness. Consequently, when typing in most office environments the hands are often cold and subject to reduced blood flow. Like an athlete who faces increased risk of injury competing in a cold environment, the typist may also face an increased risk of hand or wrist injury when typing in a cold office environment.

A number of prior art keyboard designs have been proposed in an attempt to reduce RSI. This is seen in, for example, U.S. Pat. Nos. 4,378,553 to McCall and 4,661,005 to Lahr, disclose a design where the conventional QWERTY keyboard layout is split into two separate pieces, allowing the operator to space each horizontal keypad at a comfortable interval. Other designs angle a horizontal planar keyboard into a V shape or chevron design as illustrated by U.S. Pat. Nos. 5,156,475 to Zilberman and 5,129,747 to Hutchison. Other designs split the keyboard and rotate each split half of the keypad into a vertical position as disclosed in U.S. Pat. Nos. 5,160,919 to Mohler and 5,137,384 to Spencer. These designs purport to reduce wrist deviation and hand pronation.

U.S. Pat. No. 4,597,681 to Hodges discloses an "Adjustable Keyboard" divided into two sets of keys that are adjustable relative to each other in both a horizontal and vertical manner. FIGS. 3 and 4 of Hodges indicates that the split keyboard may be pivotally adjusted to form an inverted V. Another keyboard design is disclosed in U.S. Pat. No 5,067,834 to Szmand which discloses an "Input Keyboard Apparatus for Information Processing Device and Other Keyboard Devices." The input keyboard of Szmand includes a left and right keyboard each mounted on a telescopic shaft attached to a base support plate. The two keyboards form a generally inverted V shaped spacing with each keyboard having a front-to-back inclination and a lateral side inclination with universal pivots permitting individual settings for an operator. The keyboard connecting pivot unit is releasable to allow lateral spacing of the keyboard.

There are a number of deficiencies associated with the prior art designs proposed by Hodges' and Szmand's. Those designs provide no hand support once the keyboard is angled in an inverted V shape, possibly causing additional strain to the keyboard operator. In addition, many operators do not know which keys must be pressed to obtain the shifted numeric characters, i.e., "@", "?", "~", "&", and "+", and in many cases even which keys must be pressed to obtain the number keys. The fact that the keys in Hodges and Szmand are disposed in an angle perpendicular to the operator may make reading of the individual keytop indicia by the operator difficult and time consuming, thereby reducing the speed and possibly the performance of the operator. With the Hodges and Szmand designs, the keyboard operator must still extend or move his entire hand, not just the fingers, in order to operate the function and number keys. Such movement may result in the incorrect positioning of the hands such as bending the wrist, thereby increasing the likelihood of repetitive stress injuries. Furthermore, both Hodges' and Szmand's designs fail to incorporate a trackball/mouse feature, so the operator's hand must leave the keyboard to use an auxiliary trackball/mouse.

SUMMARY OF THE INVENTION

An object of the present invention is to provide a keyboard divided into a plurality of segments, including, according to a preferred embodiment, a front, left and right keypad. The left and right keypads provide the conventional typewriter format known as QWERTY for the letters, while the numbers, specialty keys, function keys and other indicias are arranged on the front keypad. As should be evident, the present invention may be also be used in conjunction with other keyboard formats such as Dvorak, military electronics key combinations, aerospace input keys, scientific input keys and diagnostic input keys.

Another object of the invention is to provide hand rests to facilitate an operator's ease while typing. Such hand rests are disposed so as to keep the wrists substantially straight, thereby reducing injury caused by wrist deviation. Additionally, the hand rests should reduce muscle tension and tendon strains, since the hands no longer have to be held above the keyboard, as required with conventional keyboard designs. The left hand rest will extend in a substantially horizontal angle from between the front keypad and the left keypad, while the right hand rest will extend in a substantially horizontal angle from between the front keypad and the right keypad.

Another object of the invention is to provide an improved keyboard design that allows for substantially ergonomic positioning of the hands and wrists, in order to reduce the risk of repetitive stress injuries. Accordingly, the keyboard of the invention allows the hands to assume a "natural position", substantially facing together, with the thumbs up and the wrists in a substantially neutral and relaxed arc. The keyboard design of the present invention therefore represents a substantial advance over conventional keyboards which demand a pronated palm hand position that has been scientifically associated with carpal tunnel syndrome and repetitive stress injuries.

Another object of the invention is to set forth a common frame upon which the three keypads can be set in a substantially pyramid or tetrahedron shape. The three keypads can either be permanently attached to the frame or adjustable relative to each other on the frame. In one embodiment of the invention, each keypad comprises a "leg" of the frame.

Another object of this invention is to provide an improved keyboard design that maintains the operator's hands at a predetermined relatively warm temperature, thereby promoting increased blood flow, loosening of the muscles and decreasing the risk of repetitive stress injuries. According to the invention, the heat may be applied through hand rests or in any other conventional manner.

Another object of the invention is to provide an improved keyboard design which provides a front keypad facing the operator in a substantially vertical manner, facilitating use of the thumbs while typing and allowing direct and easy visual access of a plurality of different number, specialty, function and other keys.

Another object of the invention is to provide such an improved keyboard design that includes a trackball/mouse on the front keypad which allows the thumbs to operate the trackball/mouse without requiring the hand to leave the keypad.

Another object of the invention is to increase the speed the operator can type by providing an improved keyboard that allows the thumbs to be used more fully and often in the typing process.

Another object of this invention is to provide a keyboard that because of its unique shape and adjustable nature is attachable to the operator's arm.

BRIEF DESCRIPTION OF THE DRAWINGS

Other objects and advantages of the invention will be apparent from the following detailed description and upon reference to the drawings, in which.

DETAILED DESCRIPTION OF THE INVENTION

While the present invention is susceptible to various modifications and alternative forms, specific embodiments thereof are disclosed by way of example in the drawings and will herein be described in detail. It should be understood, however, that it is not intended to limit the invention to the particular form disclosed, but on the contrary, the intention is to cover all modifications, equivalents, and alternatives falling within the spirit and scope of the invention as defined by the appended claims.

In particular, the following description refers to a specific embodiment of the present invention when used as a QWERTY format keyboard input device. However, the apparatus may be used with other keyboard formats such as Dvorak, military electronics key combinations, aerospace input keys, scientific input keys and diagnostic input keys. The unique pyramid shape, adjustable keypads, hand rests and other features of the invention provide for a variety of improved keyboard operations. Thus, the present invention may easily be adapted for use in a variety of data input devices.

Figure 1:
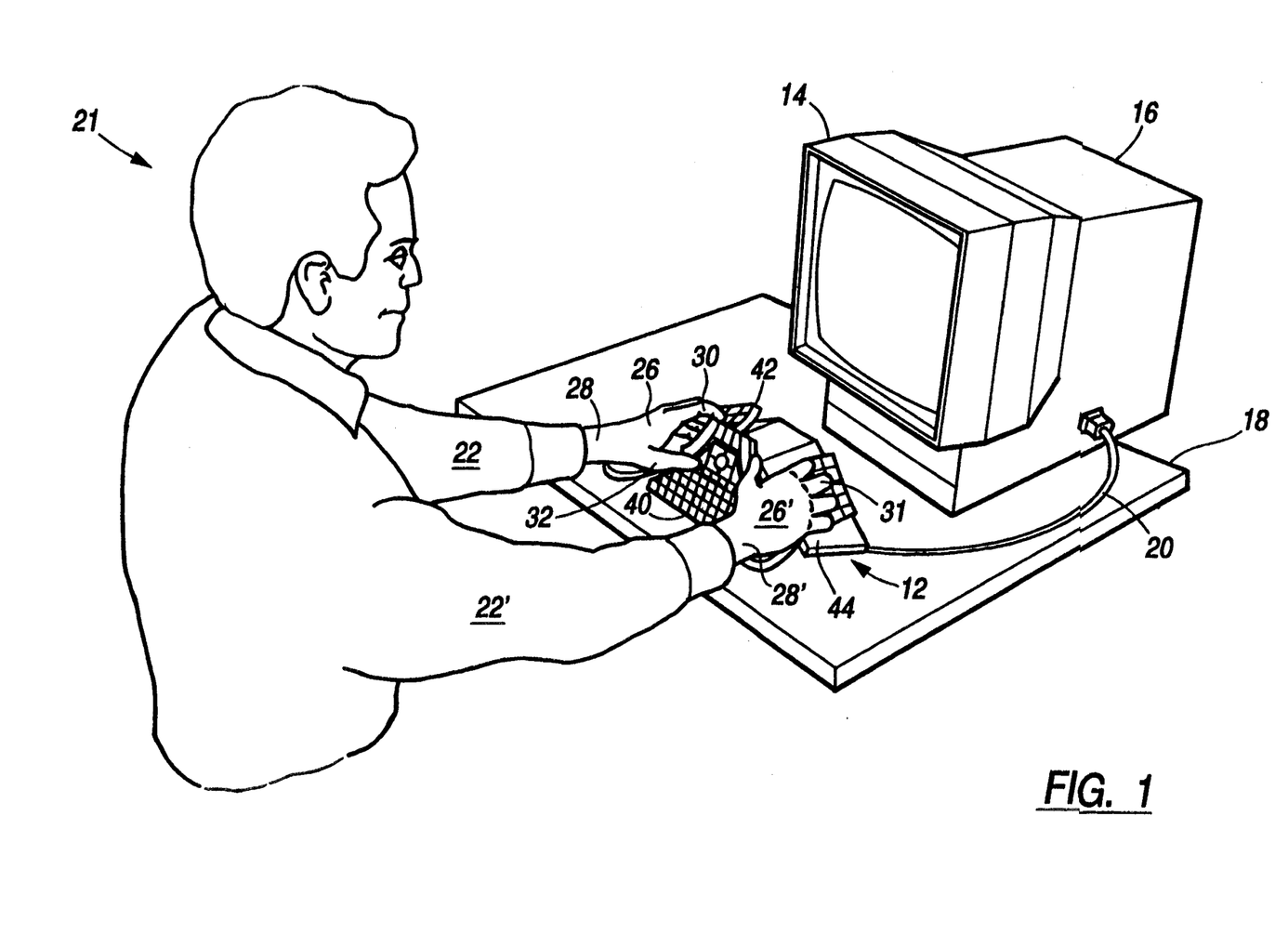
FIG. 1 is a pictorial perspective view looking over the right shoulder of the computer user shown seated with the pyramid shaped ergonomic keyboard of the present invention.

Turning now to the drawings and referring first to FIG. 1, there is illustrated a preferred embodiment of the invention, which is comprised of a pyramid shaped ergonomic keyboard 12 in combination with a conventional video display unit 14 and a central processing unit console 16 placed upon the surface of a desk 18. Power may be supplied to the keyboard 12 with a power cord 20 connected to the console 16. As illustrated in FIG. 1, the improved keyboard of the present invention allows an operator 21 to comfortably use the keyboard 12 on a regular height desk 18.

As seen in FIG. 1, the invention 12 allows the operator's hands 26/26' and arms 22/22' to be maintained in a substantially relaxed, natural position. The arms 22/22' are comfortably and naturally bent at the elbow, and the hands 26/26' are disposed in relatively close proximity to one another while positioned at approximately a 55° angle with respect to the surface of the desk 18. According to an important aspect of the invention, as illustrated, the keyboard 12 may be used while the hands 26/26' are virtually not pronated and there is virtually no deviation of the wrists 28/28'. The keyboard 12 is substantially pyramid-shaped, which allows the hands 26/26' to be placed in an ergonomic position even when used on a standard height desk 18. This represents an important advance over prior art keyboard design which generally require positioning the keyboard on a lower shelf of the desk, or even on the lap of the operator, in order to achieve any type of ergonomic effect. Another advantage of the pyramid-shaped ergonomic keyboard of the present invention is that it will result in tremendous savings to businesses and individuals which, heretofore, had to purchase specifically designed furniture to maintain the keyboard in a desired position. According to a preferred embodiment of the invention, the operator's fingers 30, 31 operate the alphabetic keys 46, and possibly the numeric keys 48, on the left 42 and right 44 keypads while the operator's thumbs 32 operate specialty keys 72, function keys 76, other indicias 78, the trackball/mouse 60, and if not provided on the left 42 and right 44 keypads, numeric keys 74 on the front keypad 40. As seen in FIG. 1, the keyboard 12 of the invention may be effectively used by the operator 21 without handrests.

Figure 2:
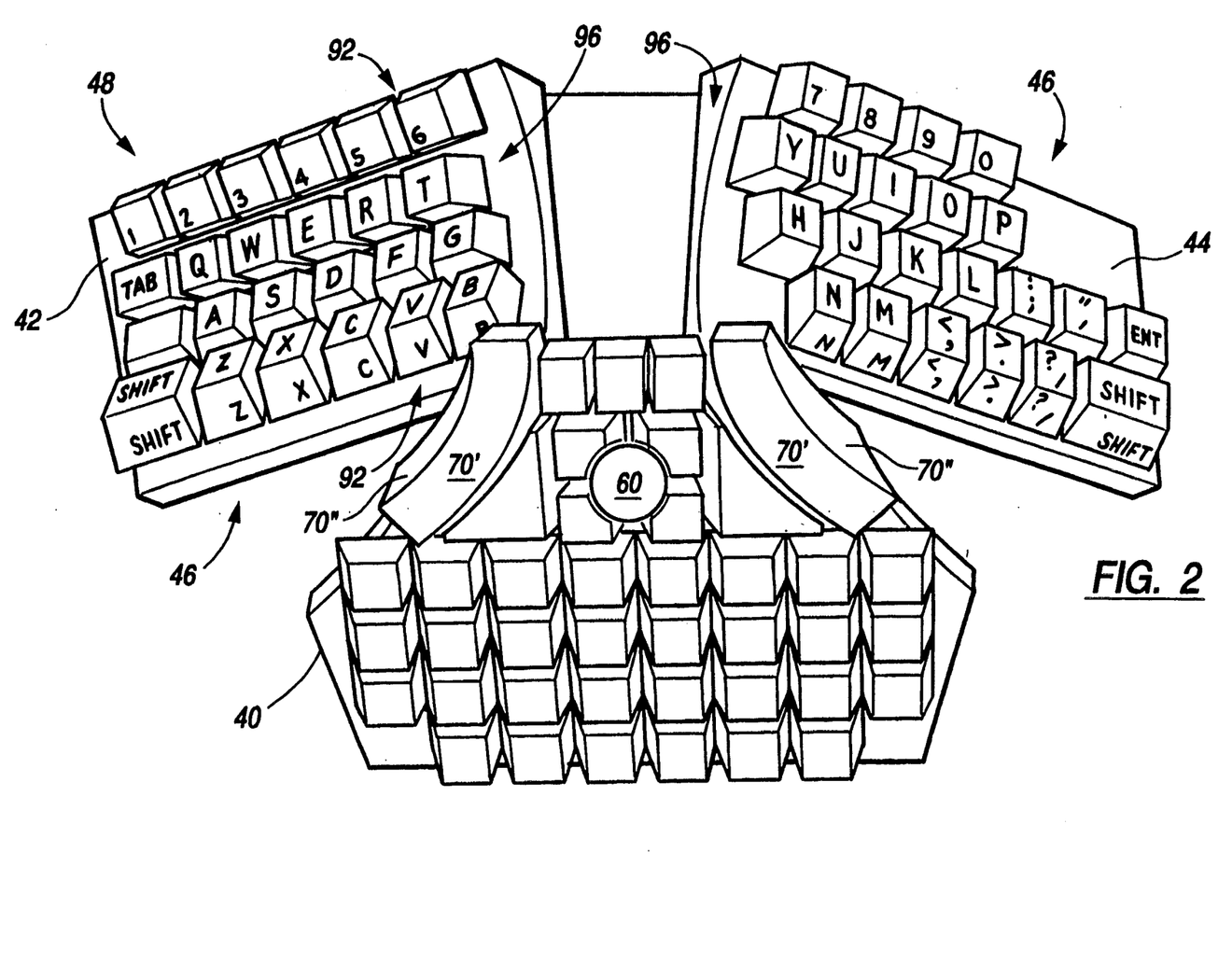
FIG. 2 is a perspective view of the three keypads without the hand rests.
Figure 3:
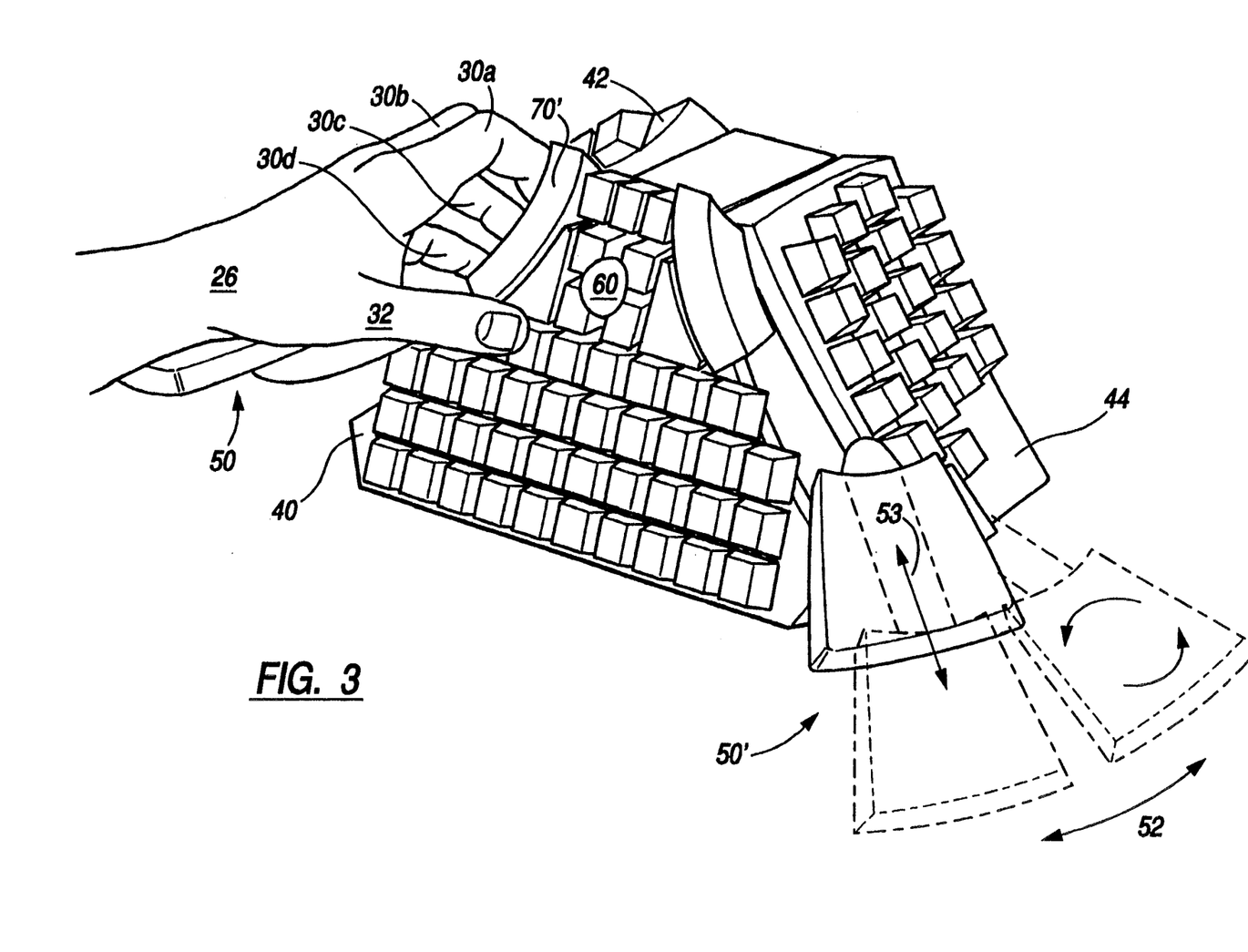
FIG. 3 is a perspective view of the three keypads and the hand rest and shows the left hand supported by the hand rest exemplifying the special ergonomic relationship of the pyramid shaped ergonomic keyboard of the present invention to the operator's hand.

Turning now to FIGS. 2 and 3, there is illustrated the front 40, left 42 and right 44 keypads of the keyboard mounted in a substantially pyramid shape, whereby the operator's left fingers 30a, 30b, 30c and 30d, operate the alphabetic keys 46 of the left keypad 42, the operator's right fingers 31a, 31b, 31c and 31d operate the alphabetic keys 46 on the right keypad 44, while the operator's left thumb 32 and right thumb 33 operate the keys and the trackball/mouse 60 on the front keypad 40. By maintaining the QWERTY keyboard format, as modified, for the alphabetic keys 46, operators will instantly be familiar with the keyboard of the present invention, rather than to become accustomed to a different keyboard format as taught by some other prior art keyboard designs.

As shown in FIG. 3 the hands 26/26' rest upon and are supported by handrests 50/50'. The handrests 50/50' facilitate maintaining the wrists 28/28' in a natural, relaxed and substantially straight position, thereby reducing the risk of CTS. Since the hands 26/26' are supported by the handrests 50/50' there is no need to hold the hands 26/26' above the keyboard 12 when typing, as is necessary when using a conventional keyboard. Thus, the present invention reduces muscle fatigue and thereby reduces the risk of repetitive stress injuries associated with excessive or prolonged muscle use or strain.

As shown in FIG. 3, the handrests 50/50' may be adjusted both horizontally 52 and vertically 53 in order to position the handrests 50/50' in the most comfortable and effective position for the operator. Thus, operators with different size hands may readily adjust or customize the handrests 50/50' for maximum comfort. The handrest may be adjusted by a screw mechanism, a ratch mechanism, a telescopic shaft mechanism or any other means known to those skilled in the art.

Figures 4A, 4B:
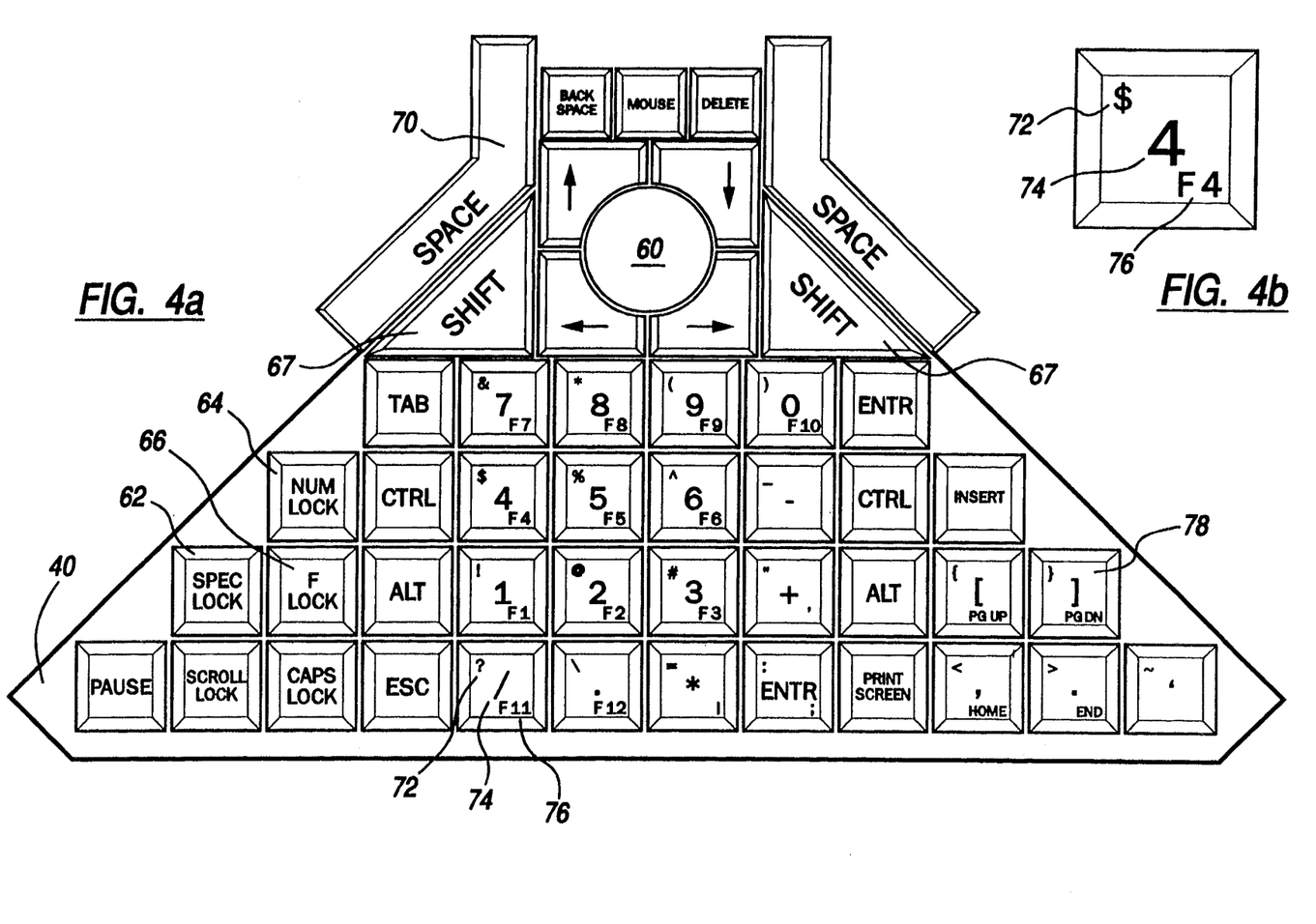
FIGS. 4a and 4b are a front elevation schematic view of the front keypad illustrating the keys on the front keypad.

As illustrated in FIGS. 3 and 4A, the front keypad 40 includes rows and columns of keys adapted primarily for actuation by the thumb of the operator's left 32 and right 33 hand. The space bar 70 can either be activated in a gripping 70' or pushing 70'' motion. The front keypad 40 may include specialty keys 72, number keys 74, other indicias 78 and a trackball/mouse 60. According to a preferred embodiment, the front keypad 40 is triangular in shape and is slightly convex. The trackball/mouse 60 may be placed on the upper portion of the front keypad 40 or may be positioned in various other positions on the front keypad 40.

The unique pyramid-shaped design for the keyboard 12 allows the hands to operate in their most natural way. The fingers 30, 31 activate the keys on the left 42 and right 44 keypad by downward depression, while the thumbs 32, 33 may activate the keys on the front keypad by gripping the front keypad keys 72, 74, 76. The thumbs 32, 33 activate the space bar 70/70' in a gripping, or alternatively, in a pushing 70'' down manner. The placement of the specialty keys 72, number keys 74, function keys 76 and other indicias 78 on the front keypad 40 facilitates visual access by the operator, and consequently, improves typing ease, speed and accuracy. Additionally, by placing the specialty keys 72, number keys 74, function keys 76 and other indicias 78 on the front keypad 40 the operator 12 can now use the thumbs 32, 33 far more often than they are used on conventional keyboards. Placement of the trackball/mouse 60 on the front keypad 40 avoids having the operator 21 move his hand away from the keypad to use the trackball/mouse 60, thereby increasing the speed of use over conventional keyboard designs. Additionally, placement of the trackball/mouse 60 on the front keypad 40, will reduce the risk of repetitive stress injuries associated with using an auxiliary trackball/mouse on a conventional design.

In FIG. 4A, the preferred embodiment of the invention includes a front keypad 40 which contains the specialty keys 72, number keys 74, function keys 76, other indicias 78 and a trackball/mouse 60. As shown in FIG. 4A and FIG. 4B many of the keys have three different uses—a specialty use, a number use, and a function use.

To operate the number keys 74 the operator must first depress the NUMBER LOCK key 64 and then the appropriate key. Except for the zero key the numbers, multiplication, division, addition, and subtraction keys are arranged in the same position as on standard key accounting panel.

The function keys 76 correspond to the number keys and will be operated by depressing the FUNCTION LOCK key 66 and then the appropriate key. For example, to activated the F5 function key, the operator 21 would depress FUNCTION LOCK key 66 and then the "5" key. The numbers "1", "2", "3", "4", "5", "6", "7", "8", "9", "0" correspond to the function keys F1, F2, F3, F4, F5, F6, F7, F8, F9, F10 when the FUNCTION LOCK key is depressed, while the "/" and "*" keys will correspond to the function keys F11 and F12.

Likewise, the specialty keys 72 correspond to the appropriate number keys 74 so that the key marked "1" will, after the operator depresses the SPECIALTY LOCK key 62, operate to transmit a quotation mark "!" character. Thus, the number keys 74 will correspond to and have the same indicias as on a standard QWERTY keyboard, when the SPECIALTY LOCK key 62 is depressed. Therefore, when the SPECIALTY LOCK key 62 is depressed, the keys "1" "2" "3" "4" etc will correspond to the characters "!", "@", "#", "$", etc.

As shown, each key on the front keypad 40 has three different uses depending on whether the SPECIALTY LOCK key 62, NUMBER LOCK key 64 or FUNCTION LOCK key 66 is depressed. Pressing any one of the lock keys 62, 64, 66 will cancel the previously depressed lock key. For example, after the NUMBER LOCK key 64 is depressed the front keypad performs as a standard key accounting panel. However, to obtain the "$" character, the SPECIALTY LOCK key 62 followed by the "4" key must depressed. To input numbers again, the NUMBER LOCK key 64 must then be depressed. A similar process applies to activate the function keys. Therefore, to activate the F4 function key, assuming that the front keypad is not currently in the function key mode, the operator must depress the FUNCTION LOCK key 66 and then "4". To input numbers again, the NUMBER LOCK key 64 must once again be depressed.

Rather than having to depress the SPECIALTY LOCK key 62 to activate a particular specialty key such as the "$" character and then having to repress the NUMBER LOCK key 64 to input numbers, if the operator wants to activate only one, or a few, specialty keys such as the "$" key, the operator can simultaneously depress the SHIFT key 67 and then press "4", or any other desired keys. As should be evident, this feature operates in a manner similar to a conventional QWERTY keyboard. The SHIFT key 67, therefore, operates to switch between the number mode and the specialty mode, similar to the manner in which pressing SHIFT makes small letters into capital letters when the CAP LOCK is not on, and capital letters into small letters when the CAP LOCK is on. For example, when the SPECIALTY LOCK key 62 is activated, pressing the SHIFT key together with "#", "$", "%" will result in the numbers "3", "4", "5" being transmitted.

When the FUNCTION LOCK key 66 is activated, depressing the SHIFT key 67 will switch to the number mode. There is, however, no switch back to the function mode. As mentioned previously, when the NUMBER LOCK key 64 is activated, depressing the SHIFT key 67 will switch to the specialty mode. According to an important aspect of the invention, the position of and the interrelationship between the number lock, specialty lock and function lock keys and their corresponding modes allows the operator to use or activate all keys without moving his hands. This feature of the invention will reduce the risk of repetitive stress injuries, since the hands 26/26' and wrists 28/28' will not have to pronate and deviate to unnatural positions to reach keys such as the function, specialty and number keys as is required on a conventional keyboard. Additionally, placement of these keys in accordance with the invention, will likely increase the operator's typing speed and accuracy.

Figure 5A:
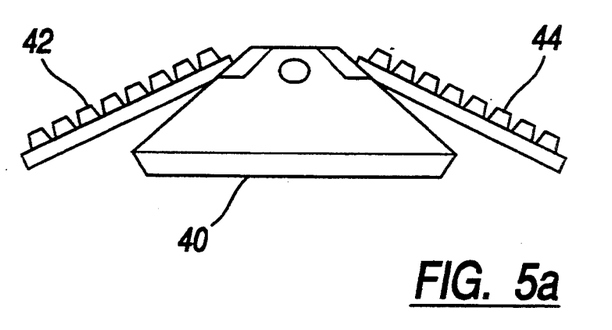
FIGS. 5A, 5B and 5C show a front elevation view that illustrates how the front, left and right keypads can be adjusted in both a horizontal and vertical manner.
Figure 5B:
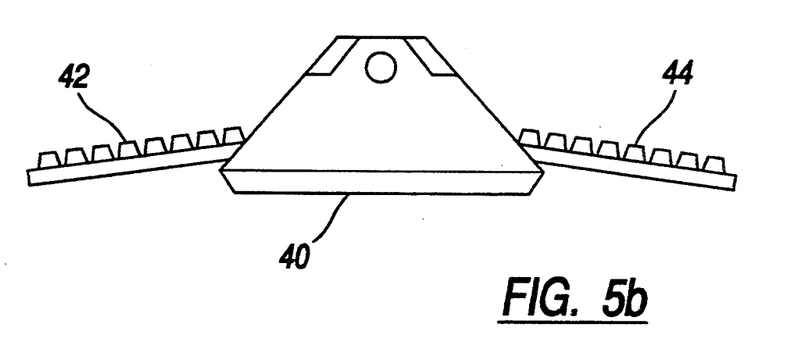
Figure 5C:
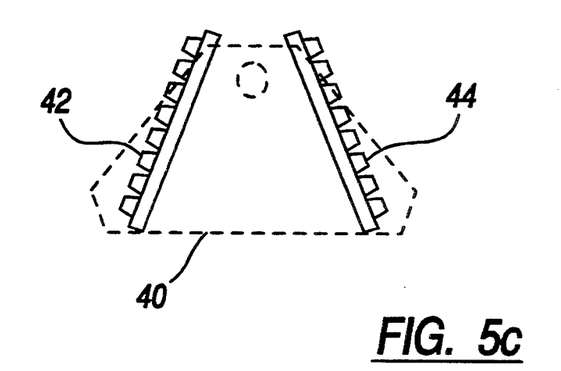

As shown in FIGS. 5A, 5B, 5C, the front keypad 40, left keypad 42 and right keypad 44 may be adjustably attached to a central frame, so that each keypad 40, 42, 44 may be pivoted and moved both horizontally and vertically to allow the keypads to be positioned at different angles relative to each other. FIG. 5A shows the front keypad 40, left keypad 42 and right keypads 44, all at approximately a 25 degree to 35degree angle relative to the desk. FIG. 5B shows the front keypad 40 at approximately a 90 degree angle while the left keypad 42 and the right keypad 44 are at approximately a 5 degree to 10 degree angle relative to the desk. FIG. 5C shows the front keypad 40, left keypad 42, and right keypad 44 all at approximately 75 degree to 90 degree angles relative to the desk.

Figure 6:
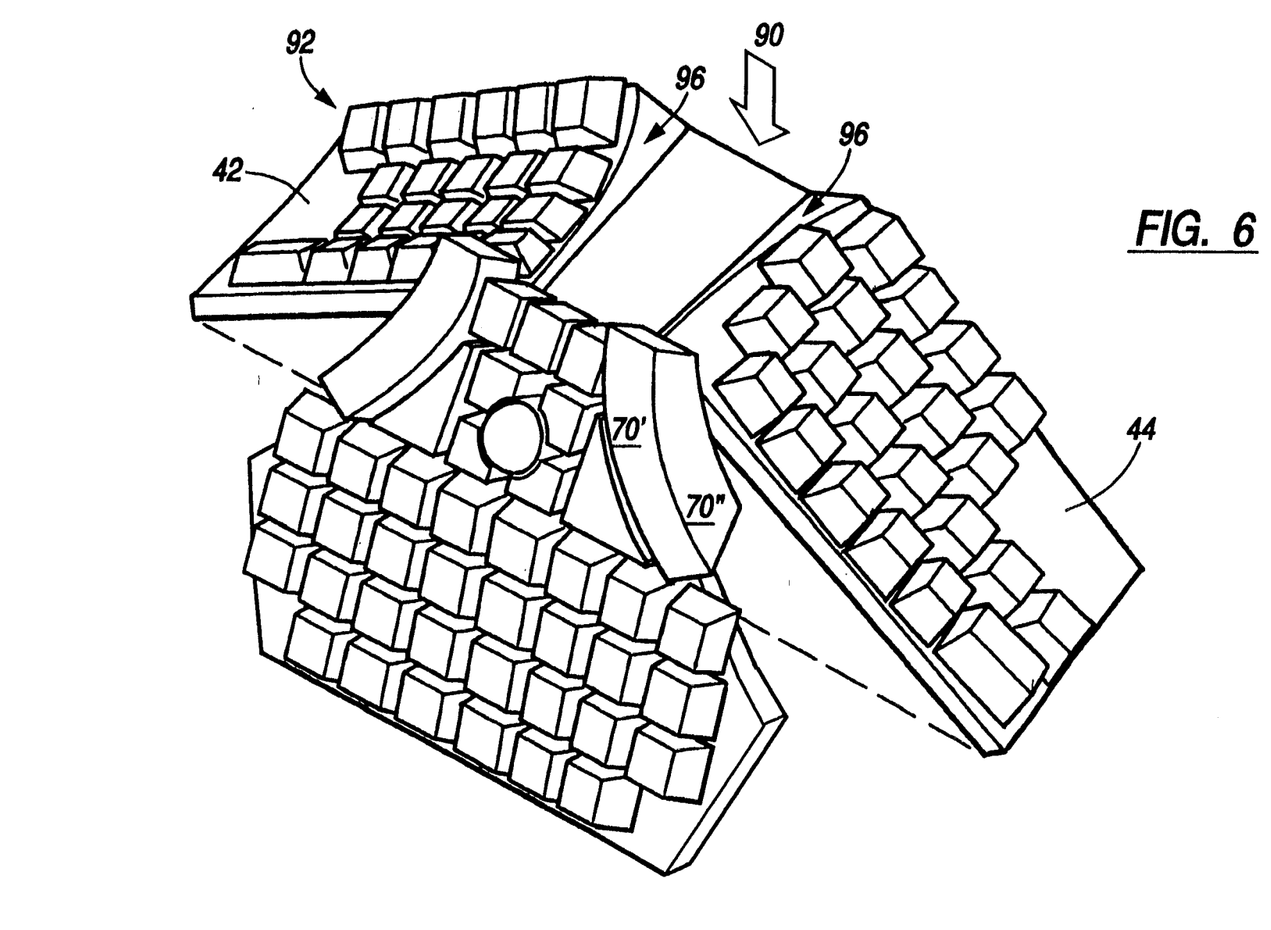
FIG. 6 is a side elevation view of the front keypad, left keypad and and right keypad.

As illustrated in FIGS. 2 and 6, the right keypad 44 is rectangular in shape and includes a portion of the alphabetic keys in a standard QWERTY format, or instead may include a portion of the alphabetic keys and numeric keys in the standard QWERTY format. As shown, the top of the right keypad 44 meets with the front keypad 40 to form substantially a vertex 90. In the illustrated embodiment, the right keypad 44 is positioned at approximately a 45° angle but may be adjusted to a different angle if desired for operator comfort and convenience when typing. As should be evident, the right keypad 44 may be adjusted up or down and backwards and forwards by any suitable conventional means. Preferably, the left keypad 42 is adjustably attached in a similar manner as the rights keypad 44.

As seen in FIG. 5 the front 40, left 42 and right 44 keypads may be independently adjusted in a horizontal and vertical, up and down, as well as a forward and backward manner. This allows the operator to adjust the different keypads to provide an angle that is most comfortable. The angled nature of the left 42 and right 44 keypads allow the hands to assume a natural and relaxed position, substantially facing together with the thumbs directed generally upward. The handrests 50/50' maintain the wrists 28/28' in a substantially neutral or relaxed arc position. When properly adjusted, the keyboard of the present invention allows the operator to perform in a more natural and relaxed position, thereby reducing the risk of carpal tunnel syndrome and other repetitive stress injuries. Additionally, the adjustability of the different keypads allows each operator to adjust the keypads relative to each other in a manner that suites the operator's particular hand size.

Since all the fingers on the hand are not the same length, certain keys 92, as shown in FIGS. 2 and 6, may be raised so they may be operated with less movement of the hands, thereby reducing wrist deviation and facilitating typing. Such keys that may be raised are predominantly those keys that are pressed by the index 31a, 32a and pinky 31d, 32d finger. In addition, the rows of keys may be shaped in a generally concave 96 manner to further reduce wrist and hand deviation associated with attempting to reach certain keys.

Figure 7A:
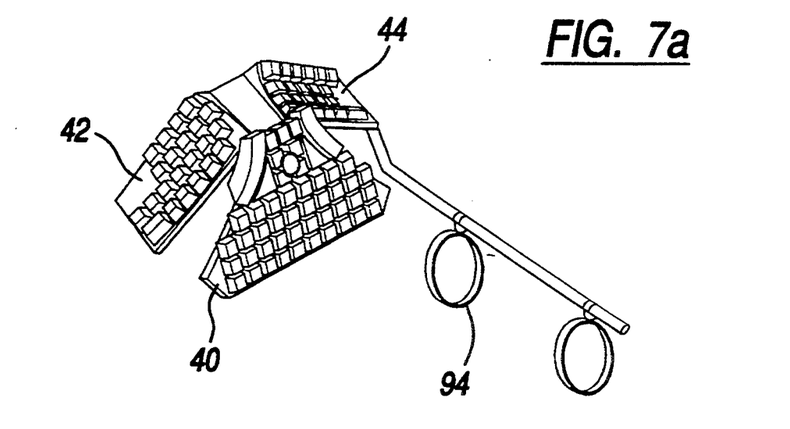
FIGS. 7A and 7B is an alternative embodiment of the pyramid shaped ergonomic keyboard of the present invention which is smaller and contains fewer keys, but may be attached to the operator's arm.
Figure 7B:
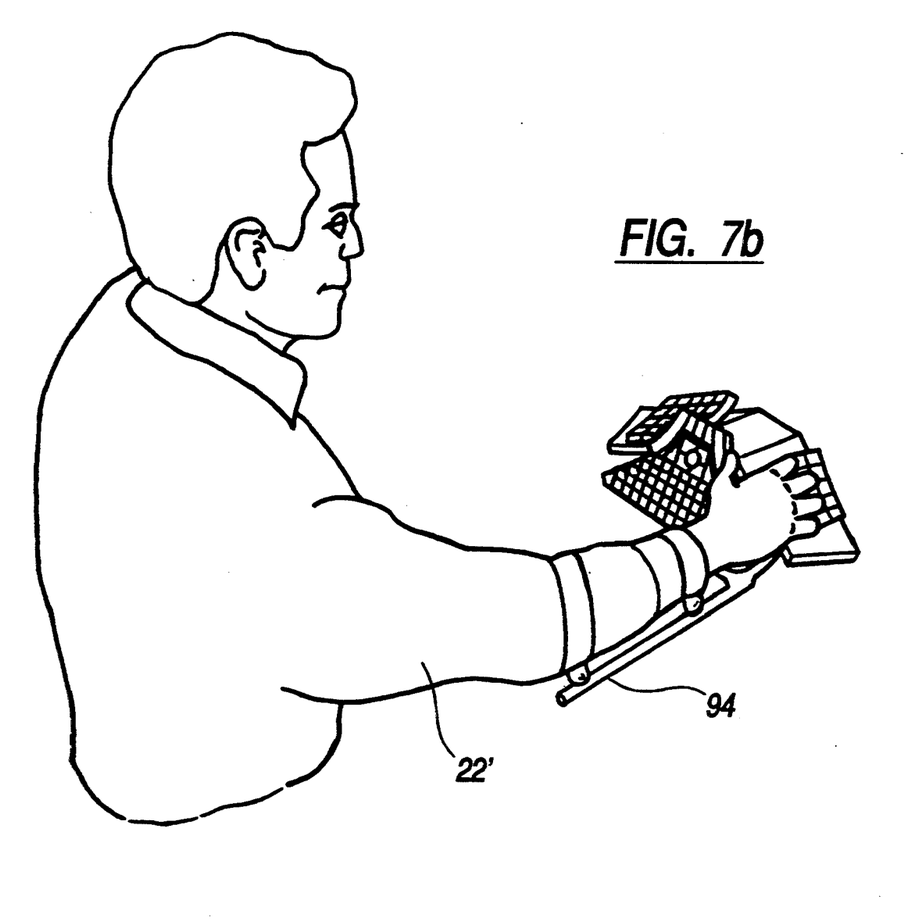

FIG. 7A shows an alternative embodiment of the invention comprising a smaller version of the pyramid shaped ergonomic keyboard 12. The left 42 and right 44 keypads are substantially similar, and as before, contain primarily the alphabetic keys. However, by pressing the SPECIALTY 62, NUMBER 64, OR FUNCTION LOCK 66 keys on the front keypad 40 the alphabetic keys on the right 44 and left 42 keypad now function as numeric, specialty or function keys. The front keypad 40 includes the specialty lock 62, number lock 64, function lock 66, arrow keys 69, and a trackball/mouse 60. In addition, the small version of the keyboard 12 has an extension and straps/supports/clasps 94 that affix to the operators arm. FIG. 7B shows how the small pyramid-shaped ergonomic keyboard is attachable 94 to the wrist/arm 22/22' in any conventional manner. In another embodiment of the invention, the pyramid-shaped keyboard may be used while resting in the lap of the operator.

What is claimed is:

1. A pyramid shaped ergonomic keyboard consisting of a common frame left keypad section, right keypad section and a thumb actuated front keypad section, said pyramid shaped ergonomic keyboard including two armrests, one for each hand of the operator, one armrest projecting from said common frame and between said left keypad section and said front keypad section, the other armrest projecting from said common frame and between said right keypad section and said front keypad section, said handrests including adjustable means to accomodate for the hands of the operator, said common frame for supporting said left keypad section, said right keypad section, and said front keypad section, said common frame including a front side, a left side and a right side, wherein said left keypad section is substantially rectangular in shape, said left keypad section being connected to the left side of said common frame, said left keypad section including a first set of alphabetic keys from a standard keyboard format, wherein said right keypad section is substantially rectangular in shape, said right keypad section being connected to the right side of said common frame, said right keypad section including a second set of alphabetic keys from a standard keyboard format, wherein said thumb actuated front keypad section is adapted for actuation by the thumb of an operator's left and right hands, said front keypad section is substantially triangular in shape having an apex pointing substantially upward, said front keypad section being connected to the front side of said common frame, said front keypad section including rows and columns, including space bars placed on the right and left edges of said front keypad section at said apex, said front keypad section further including a trackball and at least one of the group consisting of specialty keys, number keys or control keys; said front keyboard further including at least one of the group consisting of a specialty lock key, a number lock key, or a function lock key;

whereby said front keypad section is used for a plurality of uses.

2. The pyramid shaped ergonomic keyboard of claim 1, wherein said standard keyboard format is a QWERTY keyboard format.

3. The pyramid shaped ergonomic keyboard of claim 1, wherein said standard keyboard format is a Dvorak keyboard format.

4. The pyramid shaped ergonomic keyboard of claim 1, wherein one of said armrests is securely attached to the arm of the operator, said arm of the operator supporting said pyramid shaped ergonomic keyboard.

* * * * *